April 21, 1964  W. V. SPURLIN  3,129,536
ROTARY TUMBLER

Filed May 4, 1961  5 Sheets-Sheet 1

INVENTOR.
WILLIAM V. SPURLIN
BY William D. Carothers.
HIS ATTORNEY

April 21, 1964     W. V. SPURLIN     3,129,536
ROTARY TUMBLER

Filed May 4, 1961     5 Sheets-Sheet 2

INVENTOR.
WILLIAM V. SPURLIN
BY
HIS ATTORNEY

April 21, 1964

W. V. SPURLIN 3,129,536

ROTARY TUMBLER

Filed May 4, 1961

INVENTOR.
WILLIAM V. SPURLIN
BY
HIS ATTORNEY

April 21, 1964 W. V. SPURLIN 3,129,536
ROTARY TUMBLER
Filed May 4, 1961 5 Sheets-Sheet 4
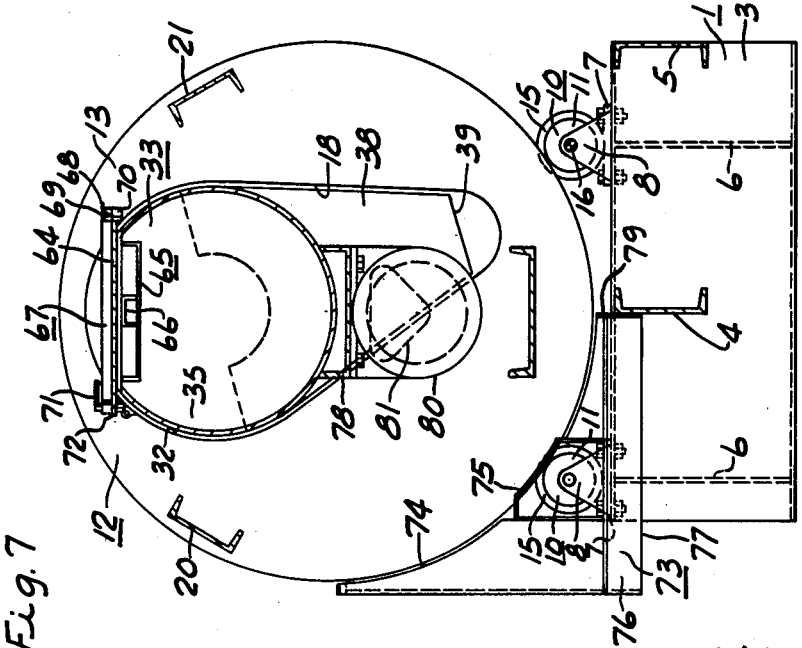
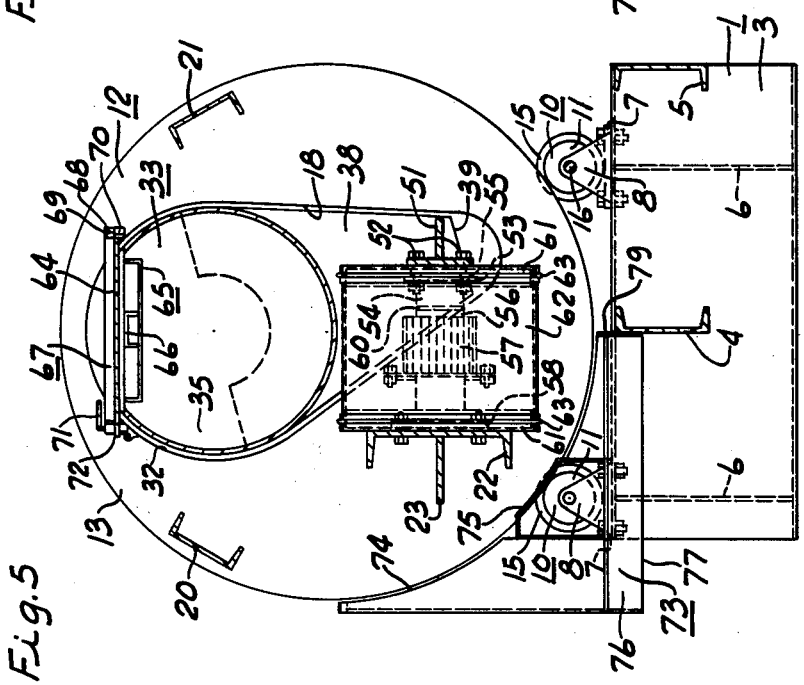
INVENTOR.
WILLIAM V. SPURLIN
BY
HIS ATTORNEY April 21, 1964     W. V. SPURLIN     3,129,536
ROTARY TUMBLER
Filed May 4, 1961     5 Sheets-Sheet 5
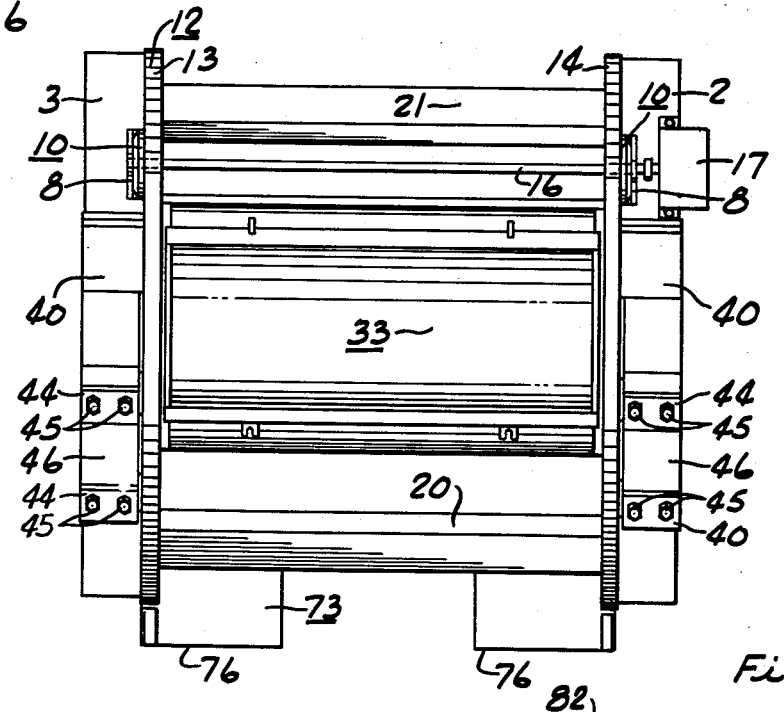
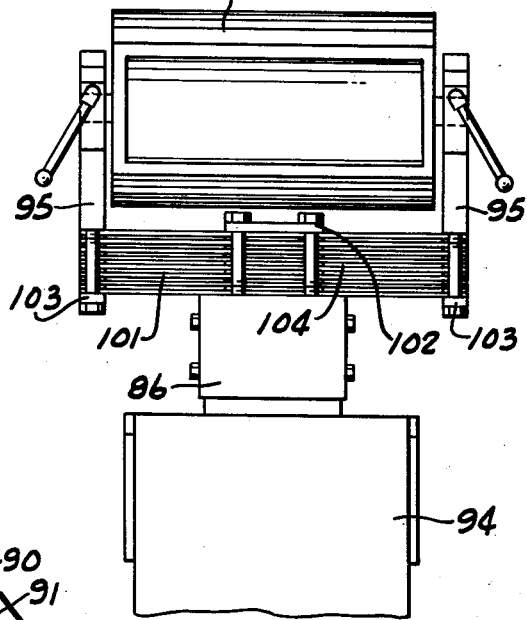
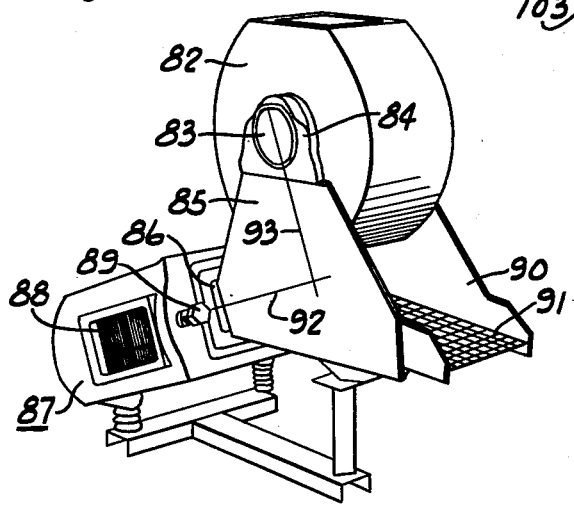
INVENTOR.
WILLIAM V. SPURLIN
BY *William D. Carothers*
HIS ATTORNEY

United States Patent Office 3,129,536
Patented Apr. 21, 1964

3,129,536
ROTARY TUMBLER
William V. Spurlin, Indiana, Pa., assignor, by mesne assignments, to Link-Belt Company, Chicago, Ill., a corporation of Illinois
Filed May 4, 1961, Ser. No. 114,590
15 Claims. (Cl. 51—163)

This invention relates generally to tumbling machines and more particularly to a tuned guide spring supported and vibratorily driven rotary tumbler.

Tumblers for the most part are mechanically supported for rotation on a horizontal or an inclined axis and the interior of the barrels have blades that pick up, mix and fold in the abrasive and parts being tumbled. When completed the barrel is inverted to dump the tumbled load and a new load takes its place. These rotary barrels have a very slow period of rotation and changing load is not uniform. The bearing, even though large, quickly wears and increases the play which speeds up the wear.

An important object of this invention is the provision of a vibratory tumbler that is self-contained and compact. By employing an electromagnetic drive an entirely different speed of tumbling is employed. It is more uniform in operation. It requires no service for oiling or other type of bearing care. It may work continuously. Being compact it is more readily located near the parts tumbling job. It may be readily combined with screened feeders to separate the parts tumbled and the abrasive. It is readily varied as to amplitude to more quickly accomplish different jobs. It is readily rotated to empty the barrel.

The vibratory barrel finishing or tumbling machines comprising this invention will finish tumbling parts in half the time because the vibratory feeding action in circulating the abrasive is constant and uniform and the parts are actually shined by the abrasive and not against each other or the inside of the barrel as the flowing media actually continuously flows carrying the parts along in the stream that revolves the parts as they are traveled in the circulating stream of media. Thus delicate and frail parts may be tumbled without breakage. This results in faster work.

Since there are not rotating or relatively moving parts there is no friction or wear. The tuned guide springs are mounted to support the barrel for vibratory arcuate reciprocation about an axial center spaced from the center or center of gravity of the barrel. This provides a feeding vibration on the inner surface of the barrel and the tumbling media flows in a circulating stream and each particle whether media or parts being tumbled will tumble about themselves as the stream of media carries them around in a rotary fashion through a prescribed path.

The barrel is supported for rotation either on its frame or as a part of the whole unit which is rolled. The unit being cyindrical or the base having spaced wheels, may roll along a track or be mounted on small support wheels which roll the unit about a fixed axis. In either case the barrel may be inverted to empty the same. Thus the base wheels have rubber tires as isolators or the small wheels supporting them are rubber tired. This rubber isolates the base from the floor or the stand upon which the device is mounted. In either event the device is readily driven to rotate the barrel and empty the same by a motor drive which eliminates handling.

When inverted it may empty through a screen trough which separates the parts from the tumbling media. The parts being conveyed away by a feeder trough.

This rotary tumbler guided by tuned springs for arcuate vibration about an axial center may have many different vibrator motor drives. One motor drive may be an electromagnet coil which is operatively mounted to attract an armature of laminations or a permanent magnet. This is a straight line force but when applied tangent to an arc of the arcuate reciprocation it delivers an arcuate feeding vibration whether the tuned guide springs are on spaced radii from the center of the arcuate reciprocation or lineal with the barrel offset to produce an arcuate feed action on the inner cylindrical surface of the barrel.

Again the tuned radially disposed springs supporting the barrel offset from the axial center of the arcuate reciprocation may be driven by any type of rotary vibratory motor which is generally of the unbalanced weight type.

In the tumbler employing a straight trough feeder type of motor where the barrel center is offset from the reciprocating straight line of motion to produce an arcuate vibratory feeding motion on the inside surface of the drum, a torsion spring may be placed intermediate the motor springs and the offset barrel, to increase the arcuate vibratory feeding motion on the inner surface of the barrel.

Other objects and advantages of this invention appear hereinafter in the following description and claims.

The accompanying drawings show for the purpose of exemplification without limiting the invention or claims thereto, certain practical embodiments illustrating the principles of this invention wherein:

FIG. 5 is a sectional view taken on the line 5—5 of FIG. 3.

FIG. 6 is a top plan view of the rotary tumbler.

FIG. 7 is a sectional view showing a rotary vibratory motor mounted on the barrel.

FIG. 8 is a perspective view of a modified form of rotary tumbler employing a feeder type motor.

FIG. 10 is a view illustrating an interposed torsion bar support between the barrel and the feeder type motor driving a rotary tumbler.

Figure 1:
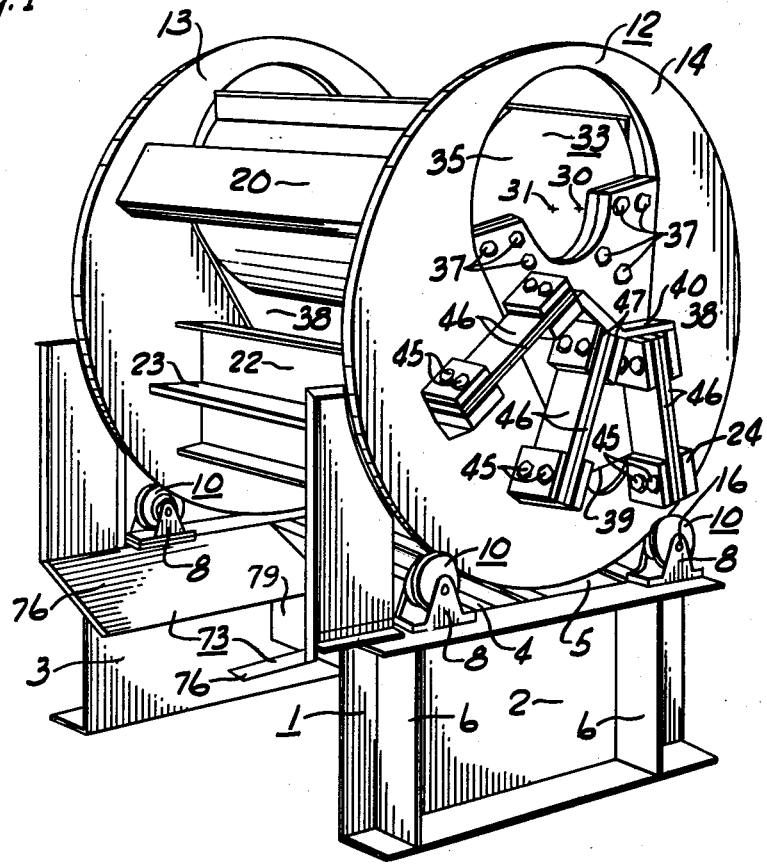
FIG. 1 is a perspective view of the rotary tumbler comprising this invention.
Figure 2:
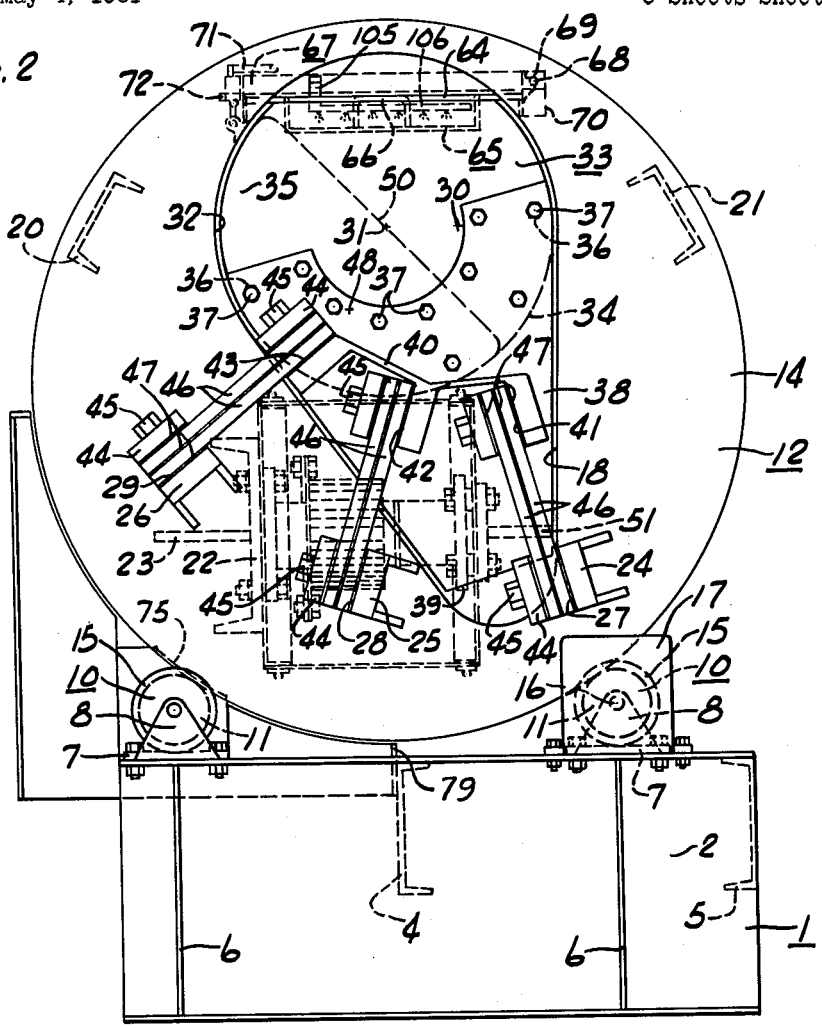
FIG. 2 is an end view of the rotary tumbler showing the tuned guide springs aligned on radii from the axial center of vibratory arcuate reciprocation.
Figure 3:
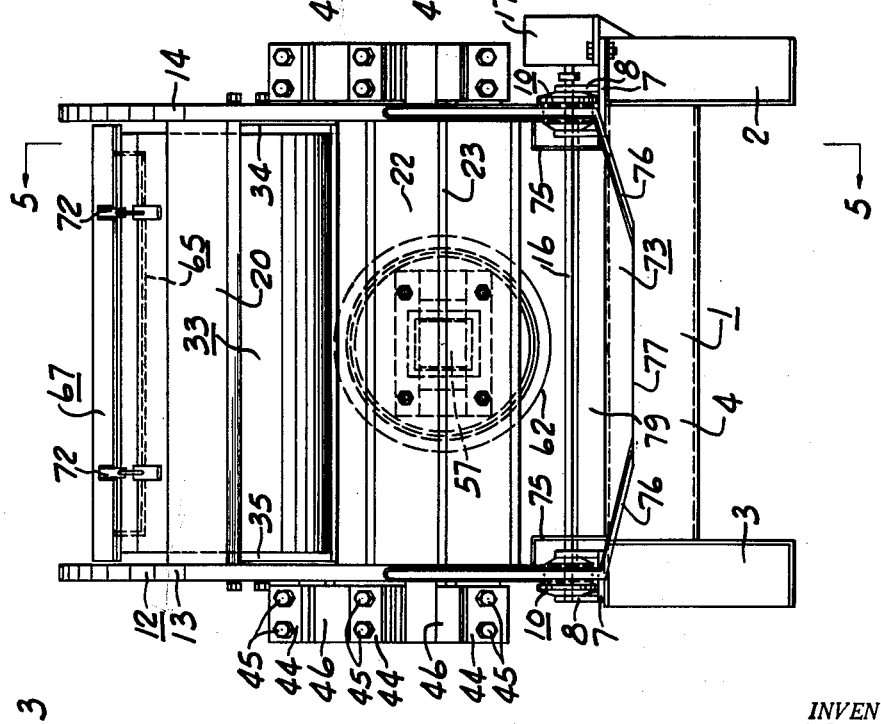
FIG. 3 is a view in side elevation showing the emptying trough.

Referring to FIGS. 1 to 3 the rotary tumbler comprising this invention is mounted on the stand 1 constructed of the side channel members 2 and 3 connected together by the spaced channel members 4 and 5. The side channel members 2 and 3 have their flanges facing outwardly and are provided with the rib supports 6 welded to the inner surface of the web and flanges of the channel members 2 and 3 for the purpose of supporting the plate members 7 carrying the spaced brackets 8 that rotatably support the rolls 10. The rolls 10 are provided with the heavy rubber tires 11. The plate 7 as shown in FIG. 3 extends over the web. However, the web is substantially in line with the load application of the rotary vibrator base 12 which base comprises the disc wheels 13 and 14 that are of considerable mass and are of substantially the same width as the rubber tires 11 and the rollers 10 as shown in FIG. 3. Each of the rollers 10 have the outer flange member 15 which retains the disc base members 13 and 14 in quadrangularly supporting these discs or wheels. A shaft 16 connects the wheels 10 at the right of the stand 1 as shown in FIGS. 2 and 5. This shaft extends beyond the bracket 8 and is directly connected to the motor 17 having a gear reduction for the purpose of driving the shaft 16 and thus rotating a pair of the flange rolls 10 and thus rotate the base of the rotary tumbler.

Each of the discs 13 and 14 forming the base of the tumbler have a matched opening cut therein as indicated at 18. This opening is centrally positioned in the two discs which are connected by the inturned channel members 20 and 21 together with the electromagnetic motor support channel member 22 which is further reinforced by a rib member 23. Thus the three channel members 20, 21 and 22 not only interlock the discs or wheels 13 or 14 but form a spool-like base 12.

On the outer face of each disc or wheel is mounted the aligned spring supporting bracket members 24, 25 and 26 with their flat clamping faces 27, 28 and 29 lying in a plane radial to the axial center of vibratory arcuate reciprocation indicated at 30. Each of the brackets 24, 25 and 26 are an equal distance from the axial center 30 and this axial center is spaced from the center 31 which represents the circular portion 32 at the upper portion of each of the openings 18 and as shown in FIG. 2 also represents the center of tumbling barrel 33 which is provided with an end arcuate plate 34 that is bolted to the ends 35 of the barrel. The arcuate plates 34 are secured to the ends 35 of the drum reinforcing the same and are provided with a series of threaded openings 36 to receive the bolts 37 clamping the plates 38 to the arcuate plates 34 providing a frame to support the barrel. Each of the plates 38 are shaped to fit the arcuate plate 34 but extend downwardly within the opening 18 but providing a uniform clearance therebetween. The plates 38 take substantially the same shape as the lower portion of the opening 18 with the exception of the bottom where the plates 38 are cut off as indicated at 39.

The unitary spring bracket member 40 is welded to the outer face of the plates 38 and provide spring clamping surfaces 41, 42 and 43 which are aligned with the respective clamping faces 27, 28 and 29 of the spring brackets on the outer face of the wheel discs 13 and 14. Cap plates 44 and bolts 45 are employed to clamp the leaf springs 46 to the respective aligned clamping surfaces of the base and barrel brackets. These springs 46 are preferably made of an epoxy polyester reinforced fiberglass. The springs 46 are separated from each other and from their bracket clamping face and the cap members by the fiber washers 47 that are relatively hard and may flex within their elastic limit to aid in the vibratory movement of the springs 46. Thus the springs 46 support the barrel 33 for vibratory arcuate reciprocation about the axial center 30. These springs being tuned to the proper operating frequency preferably a few cycles different than the driving frequency and since the springs are mounted on radii extending from the axial center of vibratory arcuate reciprocation they will guide the vibratory movement of the barrel in an arcuate path owing to the fact that the arcuate center 30 is spaced from the axial center 31 of the barrel which in turn would be spaced from the center of gravity of the barrel that may be located somewhere near the vicinity of the point 48 with the load assuming the dotted position indicated at 50. The plates 38 are connected by a T-shaped armature support member 51 which is positioned adjacent the lower ends of the plate 38 and is provided with bolts 52 for securing the base 53 of the armature 54 and the washers 55 to the face of the T-shaped armature support member in operative position with the pole faces of the core member 56 in which is mounted the electromagnetic coil member 57, the core member having its base 58 secured to the web face of the channel 22 for supporting the electromagnetic coil on the base 12. Thus the air gap 60 between the armature and the core of the electromagnet is positioned approximately below the center 31 of the barrel and below the perimeter of the barrel. This spacing is provided to enable the circular dust plates 61 to be bolted under the base of the armature 53 and the electromagnet 58 and have their annular flanges opposed to each other to receive the flexible sleeve 62 made of rubber cloth or other suitable material which is clamped to the flanges of the plate 61 by the clamp member 63 thereby entirely enclosing the electromagnetic motor to shield the same from dust created by tumbling. In view of the fact that the air gap 60 is spaced from the inner arcuate surface of the barrel 33 the amplitude between the armature and the core of the vibratory motor will be greater than the amplitude of vibration of the inner surface of the barrel 33 and as the vibratory motor is moved closer to the perimeter of the barrel, the amplitude of vibration between the core and the armature will approach the amplitude imparted to the barrel which feeds the material causing it to flow in a tumbling and generally closed path flowing up the left side of the inner surface of the barrel as shown in FIG. 2 and spilling down approximately forty-five degrees as indicated by the dotted outline 50.

The top of the barrel 33 is provided with a mouth 64 which is substantially rectangular in shape and is closed by the flanged lid 65 the central part of which is inserted into the barrel to provide for the handle members 66. A lid clamp member 67 is provided with hinge rods 68 which fit in the sockets 69 of the brackets 70 secured to the drum and extends across the flange cover 65 and is provided with toggle members 71 that have locking cams that engage through the open slotted brackets 72 and when swung will tightly clamp the lid 65 in place.

When the parts with the abrasive have been loaded in the barrel and tumbled for a predetermined period the clamp 67 is removed and the lid 65 is also removed and the motor 17 is energized to rotate the base disc wheels 13 and 14 in a counterclockwise direction as shown in FIG. 2 so as to invert the barrel with its mouth open until it spills its contents in the open bottom dump chute 73 as illustrated in FIGS. 3 and 5, the sides of which overlap the inner surface of the disc wheels 13 and 14 and extend arcuately therealong as illustrated at 74 in FIG. 5. At each wheel 10 at this end of the stand 1 a small housing 75 is secured to the chute and extends over the wheel member 10 on each side thereof thus completely enveloping the mouth 64 of the barrel 33 when it is inverted through the position indicated in dotted lines in FIG. 5. This trough having a back wall 79 and sloping sides 76 to form the opening 77 through which the material flows. A screen with a trough operated as a conveyor may be positioned under the opening 77 to receive the load and separate the abrasive material from the particles being tumbled. On the other hand, a tote box or cart may be rolled under the opening 77 to receive the load. Referring now to FIG. 7, the construction of the base and the rotary barrel supported by the tuned guide springs is the same as that shown in the previous figures. However, the electromagnetic motor support 22 and armature support 51 are omitted and in its place a channel member 78 is welded to the plates 38 with its web member facing downwardly and has mounted thereon the base of the rotary vibratory motor 80 which is constructed to provide eccentric weights on the rotor shaft indicated at dotted lines 81 for the purpose of applying circular vibratory motion to the tuned parallel structure and thus tumble the material therein in a manner very similar to that of the electromagnetic motor shown in the previous structure.

Referring now to FIG. 8, the rotary tumbling barrel 82 is provided with the trunnions 83 supported by the split clamp members 84 mounted at the top of the bracket members 85 which are bolted directly to the armature frame 86 of the vibratory motor 87. This motor is well-known in the art and comprises a stack of tuned spring members 88 bolted in place by the bolt 89 at either end of the casting. The armature and armature frame 86 is secured to the intermediate portion of the tuned springs 88 and this armature is supported in operative spaced relation with an electromagnetic field secured to the base casting of the motor 87.

The brackets 85 have extended therebetween a conveyor trough 90 with a screen 91 mounted thereabove. Thus when the rotary tumbling machine has tumbled the materials for a predetermined length of time the clamps 84 are loosened and the barrel is swung to dump the material on the screen 91 and the continued vibratory action of the motor 87 separates the parts tumbled from the abrasive material by its feeder action to the trough 90 and the screen 91.

A plane passing through the center of the armature and the armature frame is disposed along the line 92 which is at right angles to a plane passing through the axes of the trunnions 83 including the line 93. Since the axes of the barrel 82 is offset from the line 92 the vibratory forces created by the electromagnetic motor 78 are substantially tangent to that of the barrel 82 and thus provide a tumbling action.

Figure 9:
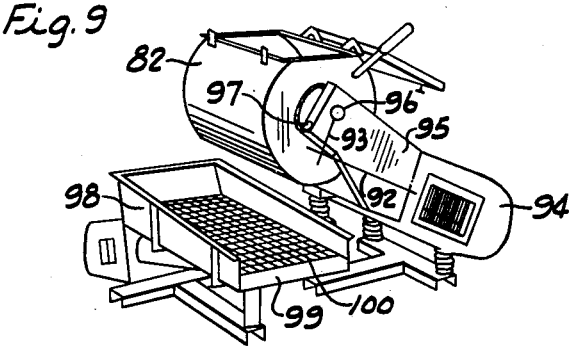
FIG. 9 is a perspective view of a second modified form of rotary tumbler employing a feeder type motor.
Figure 4:
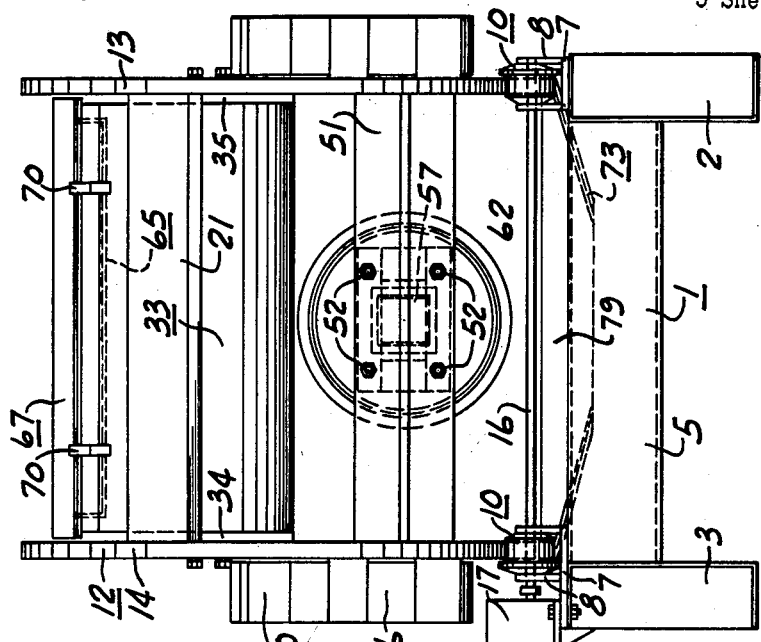
FIG. 4 is a view in side elevation showing the armature support and rotary drive.

Referring now to FIG 9, the vibratory motor 94 is of similar construction to that of the motor 87 and the armature frame is provided with the spaced arms 95 which support the trunnions 96 in the split clamp 97 on the outer end of the arms. It will be noted that the arms slope away from the line of vibration 92 and the trunnions 96 are offset from the line 92 as indicated by the line 93. Although the line 92 is spaced from the axial center of the barrel it is also intermediate of the barrel center and the perimeter of the barrel being located somewhat close to the center of gravity of the load in the barrel. This offset also produces a tumbling action and when the materials are tumbled for a predetermined period of time the clamp 97 is loosened and the barrel is rotated to dump the load on the vibratory conveyor 98 having the solid trough 99 and the screen 100 for separating the parts from the abrading material.

Referring now to FIG. 10, the structure of FIG. 9 has inserted therein the torsion member 101 which has its central portion secured by the clamp 102 to the armature frame 86 and the arms 95 are in turn secured to the outer ends of the torsion member as indicated at 103. This torsion member provides an intermediate spring support and the torsion bars which are in the form of the leaf springs 104 are twisted intermediate of their ends to increase the vibratory action of the barrel in an arcuate path. The twist created in the torsion bar structure aids in accentuating the arcuate vibratory movement of the barrel 82 and thus increases the tumbling flow of the materials in the barrel.

Each of the rotary tumblers shown herein are actuated by a vibratory motor whether it is an electromagnetic reciprocating motor or a vibratory rotary motor driving an eccentric weight and in each instance the barrel is supported for vibratory arcuate reciprocation about an axial center that is spaced from the center of gravity of the barrel for the purpose of inducing a feeding action in a closed tumbling path within the barrel and when the tumbling has been completed the barrel is rotated either by rotating the barrel independently or by rotating the whole of the rotary tumbler for the purpose of emptying the charge.

The axial center of oscillation 30 is positioned to obtain the best feed angle on the inner surface of the barrel 33. A radial line drawn from this axial center to any point on the inner surface and a line at right angles to these radial lines represents the feeding force applied to the barrel surface. This force is at angle to the inner surface of the barrel which is the feeding angle at that point. The average of such feeding angle is preferably from twenty to twenty-five degrees. The position of the springs determines the location of the axial center of oscillation which may be selected to any desired position to obtain the required results.

In some instances the abrasive medium may be employed with a liquid such as water during the tumbling operation. When the barrel is rotated to an intermediate position and flushed by introducing water through the connection 105 to the header 106 from which the water is sprayed over the tumbling load and discharged through a screen covering the mouth of the barrel to forcibly clean the parts and the media. The water discharged carries metal fines and medium particles out of the barrel. This prevents the build up of fines on the article surfaces. Thus one may water flush a tumbling load several times during the tumbling operation before emptying the same.

I claim:

1. A rotary tumbler consisting of a connected pair of wheels to provide a base means, vibratory isolating means carrying said wheels, frame means, a barrel supported on said frame means and having a mouth through which to charge and discharge materials to be tumbled in loading and unloading said barrel, vibratory motor means having at least one portion secured to said frame means to produce vibratory reciprocation of said barrel, and tuned spring guide means supporting said frame means from said wheels to position said barrel for vibratory arcuate reciprocation about an axial center spaced from the center of said wheels and said barrel to tumble material therein.

2. The rotary tumbler of claim 1 characterized by shaft and wheel means to carry said isolating means and support said barrel for rotation to invert and unload the same.

3. A rotary tumbler consisting of base means, vibratory isolating means carrying said base means, frame means, a barrel supported on said frame means and having a mouth through which to charge and discharge materials to be tumbled in loading and unloading said barrel, vibratory motor means having at least one portion secured to said frame means to produce vibratory reciprocation of said barrel, tuned spring guide means supporting said frame means from said base means to position said barrel for vibratory arcuate reciprocation about an axial center spaced from the center of said barrel to tumble material therein, means to support said barrel for rotation to invert and unload the same, including circular shaped base means to roll said rotary tumbler and disccharge material from said barrel mouth, said vibratory isolating means are spaced resilient rollers to support said circular shaped base means for rotation to invert said barrel and discharge material from said mouth.

4. The rotary tumbler of claim 3 characterized by power means to rotate selected of said rollers and invert said barrel to discharge material from the same.

5. The rotary tumbler of claim 3 characterized by a stand to carry said rollers, and a trough supported by said stand to direct the material being discharged from said barrel when inverted.

6. A rotary tumbler consisting of base means, vibratory isolating means carrying said base means, frame means, a barrel supported on said frame means and having a mouth through which to charge and discharge materials to be tumbled in loading and unloading said barrel, vibratory motor means having at least one portion secured to said frame means to produce vibratory reciprocation of said barrel, tuned spring guide means supporting said frame means from said base means to position said barrel for vibratory arcuate reciprocation about an axial center spaced from the center of said barrel to tumble material therein, said vibratory motor means includes a coil on a core unit mounted on said base means, an armature mounted on said frame in operative relation with said core, said coil pulling said armature to reciprocate said frame in an arcuate path about said axial center.

7. A rotary tumbler consisting of base means, vibratory isolating means carrying said base means, frame means, a barrel supported on said frame means and having a mouth through which to charge and discharge materials to be tumbled in loading and unloading said barrel, vibratory motor means having at least one portion secured to said frame means to produce vibratory reciprocation of said barrel, tuned spring guide means supporting said frame means from said base means to position said barrel for vibratory arcuate reciprocation about an axial center spaced from the center of said barrel to tumble material therein, the forces of said vibratory motor means are spaced outwardly from the axial center of said barrel.

8. A rotary tumbler consisting of base means, vibratory isolating means carrying said base means, frame means, a barrel supported on said frame means and having a mouth through which to charge and discharge materials to be tumbled in loading and unloading said barrel, vibratory motor means having at least one portion secured to said frame means to produce vibratory reciprocation of said barrel, tuned spring guide means supporting said frame means from said base means to position said barrel for vibratory arcuate reciprocation about an axial center spaced from the center of said barrel to tumble material therein, said base means are spaced circular wheels, and said vibratory isolators are annular resilient tires on said wheels.

9. A rotary tumbler consisting of base means, vibratory isolating means carrying said base means, frame means, a barrel supported on said frame means and having a mouth through which to charge and discharge materials to be tumbled in loading and unloading said barrel, vibratory motor means having at least one portion secured to said frame means to produce vibratory reciprocation of said barrel, tuned spring guide means supporting said frame means from said base means to position said barrel for vibratory arcuate reciprocation about an axial center spaced from the center of said barrel to tumble material therein, said base means includes spaced parallel wheels having cross member means connecting them together and provided with aligned openings, said frame means carrying said barrel and includes spaced parallel plates smaller than said openings and having cross member means connecting the plates together, said frame cross member means positioning said plates in said openings with their outer surfaces substantially flush with the outer surfaces of said wheels, and aligned brackets on said outer surfaces of said plates and wheels to receive said tuned spring guide means to support said plates for arcuate reciprocation in said wheel openings.

10. A rotary tumbler consisting of base means, vibratory isolating means carrying said base means, frame means, a barrel supported on said frame means and having a mouth through which to charge and discharge materials to be tumbled in loading and unloading said barrel, vibratory motor means having at least one portion secured to said frame means to produce vibratory reciprocation of said barrel, tuned spring guide means supporting said frame means from said base means to position said barrel for vibratory arcuate reciprocation about an axial center spaced from the center of said barrel to tumble material therein, said base means and said frame means each having parallel plates, aligned openings in said base means plates in which said frame means plates are mounted, and aligned brackets on said plates to receive said tuned spring guide means to support said barrel for arcuate reciprocation.

11. The rotary tumbler of claim 10 characterized in that said brackets include a plurality of sets each with a spring clamping face, the spring clamping faces of each set of brackets being aligned on spaced radii extending from said axial center.

12. A rotary tumbler consisting of base means, vibratory isolating means carrying said base means, frame means, a barrel supported on said frame means and having a mouth through which to charge and discharge materials to be tumbled in loading and unloading said barrel, vibratory motor means having at least one portion secured to said frame means to produce vibratory reciprocation of said barrel, tuned spring guide means supporting said frame means from said base means to position said barrel for vibratory arcuate reciprocation about an axial center spaced from the center of said barrel to tumble material therein, said vibratory motor means is a rotary vibratory motor means attached to said frame means in spaced relation from the center of said barrel.

13. A rotary tumbler consisting of base means, vibratory isolating means carrying said base means, frame means, a barrel supported on said frame means and having a mouth through which to charge and discharge materials to be tumbled in loading and unloading said barrel, vibratory motor means having at least one portion secured to said frame means to produce vibratory reciprocation of said barrel, tuned spring guide means supporting said frame means from said base means to position said barrel for vibratory arcuate reciprocation about an axial center spaced from the center of said barrel to tumble material therein, shaft means on said barrel rotatably supported in said frame means to rotate said barrel to empty the same, and means to clamp said shaft means in said frame means when tumbling.

14. A rotary tumbler consisting of base means, vibratory isolating means carrying said base means, frame means, a barrel supported on said frame means and having a mouth through which to charge and discharge materials to be tumbled in loading and unloading said barrel, vibratory motor means having at least one portion secured to said frame means to produce vibratory reciprocation of said barrel, tuned spring guide means supporting said frame means from said base means to position said barrel for vibratory arcuate reciprocation about an axial center spaced from the center of said barrel to tumble material therein, said tuned spring guide means are parallel leaf springs supporting said frame means for reciprocation in a plane at right angles to a radius from said axial center of arcuate reciprocation.

15. The rotary tumbler of claim 14 characterized by torsion means interposed in said frame means between said parallel leaf springs and said barrel.

References Cited in the file of this patent

UNITED STATES PATENTS

| | | |
|---|---|---|
| 1,063,478 | Uebersax | June 3, 1913 |
| 1,921,267 | Smith | Aug. 8, 1933 |
| 2,952,950 | Morris | Sept. 20, 1960 |
| 2,973,606 | Brandt | Mar. 7, 1961 |
| 2,994,165 | Brevik | Aug. 1, 1961 |
| 2,997,813 | Brandt | Aug. 29, 1961 |
| 2,997,814 | Brandt | Aug. 29, 1961 |
| 3,037,327 | Ferrara | June 5, 1962 |